United States Patent [19]

Ueki

[11] Patent Number: 4,746,862
[45] Date of Patent: May 24, 1988

[54] APPARATUS FOR DETECTING BOTH ROTATIONAL SPEED AND REFERENCE ROTATIONAL ANGLE OF A ROTARY MEMBER

[75] Inventor: Yasuhiro Ueki, Sagamihara, Japan

[73] Assignee: Victor Company of Japan Ltd., Japan

[21] Appl. No.: 863,256

[22] Filed: May 13, 1986

[30] Foreign Application Priority Data

| May 14, 1985 | [JP] | Japan | 60-71223[U] |
| May 27, 1985 | [JP] | Japan | 60-78817[U] |
| May 27, 1985 | [JP] | Japan | 60-78818[U] |

[51] Int. Cl.$^4$ .............. G01P 3/44; G01P 3/487; G01B 7/30
[52] U.S. Cl. .............. 324/208; 324/174; 360/73
[58] Field of Search .............. 324/163–167, 324/173, 174, 207, 208; 340/671, 672, 870.31, 870.32, 870.33, 870.34; 360/73; 310/156, 168

[56] References Cited

U.S. PATENT DOCUMENTS

| 4,072,893 | 2/1978 | Huwyler | 324/208 |
| 4,529,934 | 7/1985 | Heinrich | 324/173 |
| 4,551,676 | 11/1985 | Amemiya et al. | 324/174 X |
| 4,599,561 | 7/1986 | Takahashi et al. | 324/208 |
| 4,695,795 | 9/1987 | Nakamizo et al. | 324/208 |

FOREIGN PATENT DOCUMENTS

| 0156656 | 12/1979 | Japan | 324/208 |
| 0210517 | 12/1983 | Japan | 324/208 |
| 0610020 | 6/1978 | U.S.S.R. | 324/174 |

Primary Examiner—Gerard R. Strecker
Attorney, Agent, or Firm—Lowe, Price, LeBlanc, Becker & Shur

[57] ABSTRACT

In a rotation sensor for generating a signal indicative of a reference rotational angle or position of the rotary member, the arrangement of elements, such as magnetized areas or sector, as well as the arrangement of associated signal generating circuits, such as convex and concave coil portions arranged circumferentially, is improved so that both speed signal and reference rotational angle signal can be obtained from a single output signal from the series circuit of the signal generating circuits. In one embodiment, magnetized areas as well as convex portions of an associated wave-like coil pattern are arranged according to geometrical progression so that the magnetized portions and the convex portions agree with each other only once per rotation of the rotary member over a predetermined angle to develop a higher voltage, while low voltage is generated on non-agreement.

8 Claims, 7 Drawing Sheets

TIME

APPARATUS FOR DETECTING BOTH ROTATIONAL SPEED AND REFERENCE ROTATIONAL ANGLE OF A ROTARY MEMBER

BACKGROUND OF THE INVENTION

This invention relates generally to rotation sensor which generates a signal indicative of a reference position or rotational angle of a rotary member used in various apparatus, such as recording/reproducing apparatus including video tape recorder, video disc player or the like.

In a recording/reproducing apparatus, a reference position of a rotary member, such as a turntable of a video disc or a rotary drum carrying video heads, has to be detected for performing accurate playback for instance. According to a conventional rotation sensor, a portion of a rotary disc arranged to rotate with a disc motor is magnetized and the passage of the same is detected by a coil providing to oppose the magnetized portion. However, in such an arrangement, since the number of coil turns is very small, such as one or two, in correspondence with the number of poles of the magnetized portion, the output signal level from the coil is relatively low and signal-to-noise (S/N) ratio is also relatively low. Furthermore, such rotation sensor can produce an output signal once per one revolution of a rotary member, and thus accurate detection of rotational speed is not achieved.

On the other hand, conventional tachogenerator comprises a plurality of magnetized portions, i.e. N and S poles, circumferentially arranged alternately, and a circular coil pattern associated with the magnetized portions to detect the passage of the same. However, such conventional tachogenerator produces an output signal in the form of pulses which indicate only the rotational speed but no reference position or angle.

In this way, according to conventional techniques it is required to provide a reference position detector and a tachogenerator separately for obtaining two signals respectively indicating a reference position or rotational angle and a rotational speed of the rotary member. As a result, entire structure of such separated arrangement is apt to be bulky, while output signal from the reference position detector or sensor is of relatively low amplitude. Especially, such low amplitude output results in low signal-to-noise ratio which may cause inaccurate detection of a reference position of a rotary member.

Furthermore, conventional arrangement requires a large number of parts due to such separate structure, resulting in high manufacturing cost.

SUMMARY OF THE INVENTION

The present invention has been developed in order to remove the above-described drawbacks inherent in the conventional rotation sensor, tachogenerator or the like.

It is, therefore, an object of the present invention to provide a new and useful apparatus for generating a first signal pulse train signal indicative of rotational speed of a rotary member and a second pulse signal indicative of a reference position or rotational angle of the rotary member with simple structure and with sufficient output signal level.

According to a feature of the present invention elements such as magnetized portions are arranged on a rotary member circumferentially in a predetermined fashion or pattern, while associated signal generating circuits, such as coils arranged to face the elements, are also arranged in the same fashion or pattern as the elements. Therefore, the elements exactly correspond to or agree with the signal generating circuits only once per rotation of the rotary member over a predetermined angle. Thus high voltage is induced on such agreement, while relatively low voltage is induced during rotation of the rotary member, and these two voltages are then separated from each other to produce a reference position signal and a speed signal respectively.

In accordance with the present invention there is provided apparatus for producing a signal indicative of a rotational speed of a rotary member and another signal indicative of a reference rotational angle of said rotary member, comprising: a plurality of elements arranged circumferentially on said rotary member, said plurality of elements being arranged in a predetermined mark-space fashion or pattern; a plurality of signal generating circuits arranged circumferentially to oppose said plurality of elements when said rotary member rotates, said plurality of signal generating circuits being connected in series to form a series circuit so as to develop a resultant voltage across two terminals of said series circuit with said signal generating circuits being caused by said elements to generate a voltage, said plurality of signal generating circuits being arranged in said predetermined mark-space fashion or pattern so that said mark-space fashion of all of said plurality of elements agree with said mark-space fashion or pattern of all of said signal generating circuits only once per rotation of said rotary member over a predetermined angle; a first comparator responsive to said resultant voltage and to a first threshold voltage for producing said signal indicative of a rotational speed; and a second comparator responsive to said resultant voltage and to a second threshold voltage, which is different from said first threshold voltage, for producing said another signal indicative of a reference rotational angle of said rotary member.

In accordance with the present invention there is also provided apparatus for producing a signal indicative of a rotational speed of a rotary member and another signal indicative of a reference rotational angle of said rotary member, comprising: a plurality of elements arranged on said rotary member consecutively along the circumference of said rotary member except for a space portion interposed between two of said elements; a plurality of signal generating circuits arranged circumferentially to oppose said plurality of elements when said rotary member rotates, said plurality of signal generating circuits being connected in series to form a series circuit so as to develop a resultant voltage across two terminals of said series circuit with said signal generating circuits being caused by said elements to generate a voltage, said plurality of signal generating circuits being arranged consecutively along the circumference of said rotary member except for a space portion so that said space portion in the arrangement of said plurality of elements agrees with said space portion in the arrangement of said signal generating circuits only once per rotation of said rotary member over a predetermined angle; a first comparator responsive to said resultant voltage and to a first threshold voltage for producing said signal indicative of a rotational speed; and a second comparator responsive to said resultant voltage and to a second threshold voltage, which is different from said first threshold voltage, for producing said another signal indicative of a reference rotational angle of said rotary member.

In accordance with the present invention there is further provided apparatus for producing a signal indicative of a rotational speed of a rotary member and another signal indicative of a reference rotational angle of said rotary member, comprising: a plurality of elements arranged circumferentially on said rotary member, said plurality of elements having normal-pitch elements and small-pitch elements which are arranged in a predetermined fashion or pattern; a plurality of signal generating circuits arranged circumferentially to oppose said plurality of elements when said rotary member rotates, said plurality of signal generating circuits being connected in series to form a series circuit so as to develop a resultant voltage across two terminals of said series circuit with said signal generating circuits being caused by said elements to generate a voltage, said plurality of signal generating circuits having normal-pitch circuits and small-pitch circuits which are arranged in said predetermined fashion or pattern so that said normal-pitch elements face said normal-pitch circuits and said small-pitch elements face said small-pitch circuits respectively only once per rotation of said rotary member over a predetermined angle; a first comparator responsive to said resultant voltage and to a first threshold voltage for producing said signal indicative of a rotational speed; and a second comparator responsive to said resultant voltage and to a second threshold voltage, which is different from said first threshold voltage, for producing said another signal indicative of a reference rotational angle of said rotary member.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1A:
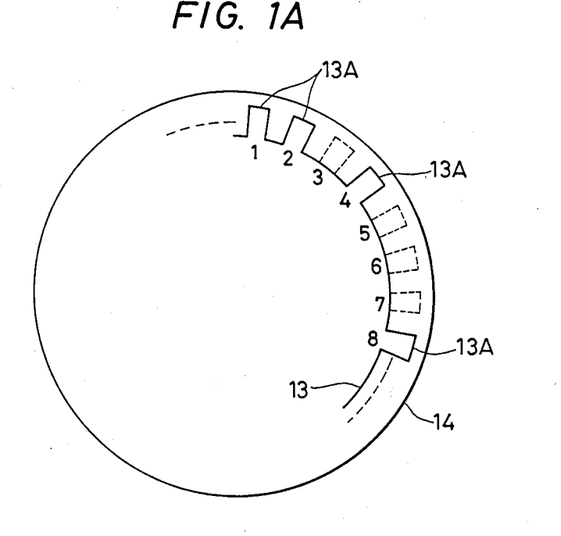
FIG. 1A is a top plan view of a stationary disc used in a first embodiment of the present invention.
Figure 1B:
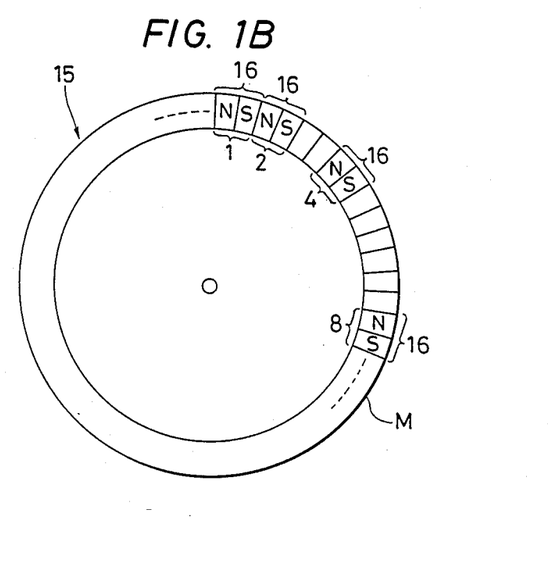
FIG. 1B is a top plan view of a rotary disc or rotor magnet also used in the first embodiment.
Figure 2:
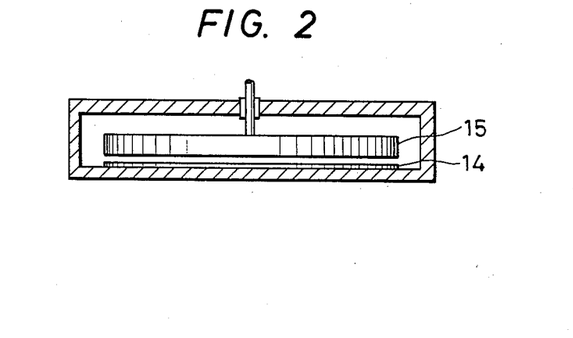
FIG. 2 is a schematic side view of the stationary disc and the rotor magnet shown in FIGS. 1A and 1B.

Referring now to FIGS. 1A and 1B a first embodiment of the present invention is illustrated. FIG. 1A shows a top plan view of a stationary disc 14 on which a wave-like coil pattern 13 is formed circumferentially, while FIG. 1B shows a top plan view of a rotary disc 15 or rotor magnet having a circumferentially magnetized portion M. The rotor magnet 15 and the stationary disc 14 with the printed coil pattern 13 thereon are arranged to face each other having a small gap or distance therebetween as shown in FIG. 2.

As shown in FIG. 1B, more specifically, the magnetized portion M comprises a plurality of sectors of N and S poles alternately arranged circumferentially. It is to be noted, however, that a set of consecutive N and S poles constitute a magnetized area 16, and a plurality of magnetized areas 16 are arranged at an interval which increases from zero successively in clockwise direction. In other words, magnetized areas 16, i.e. sets of consecutive N and S poles in this embodiment, are not continuously arranged one after another but are arranged so that some are thinned out from an imaginary arrangement where magnetized areas 16 are continuously provided circumferentially. In the illustrated embodiment, a first set of N and S poles 1 is followed immediately by a second set of N and S poles 2, and a thrid set of N and S poles follows the second set with a space corresponding to one set. Then a third set is followed by a fourth set with a space corresponding to three sets. In this way, assuming a pitch of a magnetized area 16 equals the circumferential length or subtending angle of a set of consecutive N and S poles, the magnetized areas 16 are present as 1, 2, 4, 8 ... where the numerals designate magnetized areas 16 among equidistantly or equiangularly arranged areas or sectors. These numerals designating magnetized areas 16 are given by $2^n \cdot K$ where $n=0, 1, 2, 3, 4, 5 \ldots$ and K is a positive integer. Thus, when K is 1, $2^n \cdot K$ gives 1, 2, 4, 8 .... Although each magnetized area 16 comprises N pole and S pole, only one of N and S poles may be provided in each magnetized area 16.

As shown in FIG. 1A, the coil pattern 13 includes a repetitive convex and concave wave-like pattern, where each wave is rectangular. The convex and concave pattern is formed such that convex portions 13A are present to oppose the magnetized areas 16 which go 1, 2, 4, 8 .... In other words, an equiangular arrangement is subjected to thinning so that convex portions 13A are provided as indicated by solid lines where thinned out portions are indicated at dotted lines. The coil pattern 13 is formed by printing a conductor layer so that each convex portion 13A, i.e. radially outwardly going pulse like coil pattern, has a substantially rectangular shape. Since the convex portions 13A of the coil pattern 13 are formed in the same fashion as the magnetized areas 16 of the magnetized portion M, the convex portions 13A at positions 1, 2, 4, 8 ... respectively face the magnetized areas 16 which go 1, 2, 4, 8 ... once a revolution of the rotor magnet 16 of FIG. 1B. The convex portions 13A are connected in series so as to produce a resultant sum voltage across two terminals of the series circuit with each voltage generated by each convex portion 13 being summed up.

The total number of the convex portions 13A or the magnetized areas 16 is given by:

$$M \geq \sum_{n=0}^{N1} 2^n$$

where N1 is a maximum number of a progression.
Therefore, when n=0, 1, 2, 3, 4 . . . , $$\sum_{n=1}^{4} 2^n = 1 + 2 + 4 + 8 + 16 = 31$$

From the above the number of the convex portions 13A in the coil pattern 13 as well as the number the magnetized areas 16 is selected to a suitable value which is preferably at least 31. However, the number of the convex portions 13A as well as the number of magnetized areas 16 may be set to an arbitrary value, such as 51.

In this way, according to the first embodiment of the present invention shown in FIGS. 1A and 1B, both the convex portions 13A in the wave-like coil pattern 13 and the magnetized areas 16 are arranged in the same fashion according to the same progression. This progression in the illustrated embodiment of FIGS. 1A and 1B is a geometrical progression, but other progression other than an arithmetical progression may be applicable. Furthermore, such progression is not necessarily arranged in order. In other words, the sets of magnetized areas 16 as well as associated convex portions 13A may be arranged with distances or spaces as 1, 8, 4, 2, 16 . . . , 2, 16, 4, 1, 8 . . . or the like.

Moreover, although the exact agreement between the magnetized areas 16 and the convex portions 13A occurs once a revolution in the illustrated embodiment, the magnetized areas 16 and the convex portions 13A may be arranged respectively so that they agree with each other twice, three times or more a per a full turn of the rotary magnet 15. In other words, the mark-space fashion of all of the plurality of magnetized areas 16 agrees with the mark-space fashion of all the convex portions 13A each functioning as a signal generating circuit only once per rotation of the rotor magnet 15 over a predetermined angle.

Figure 3:
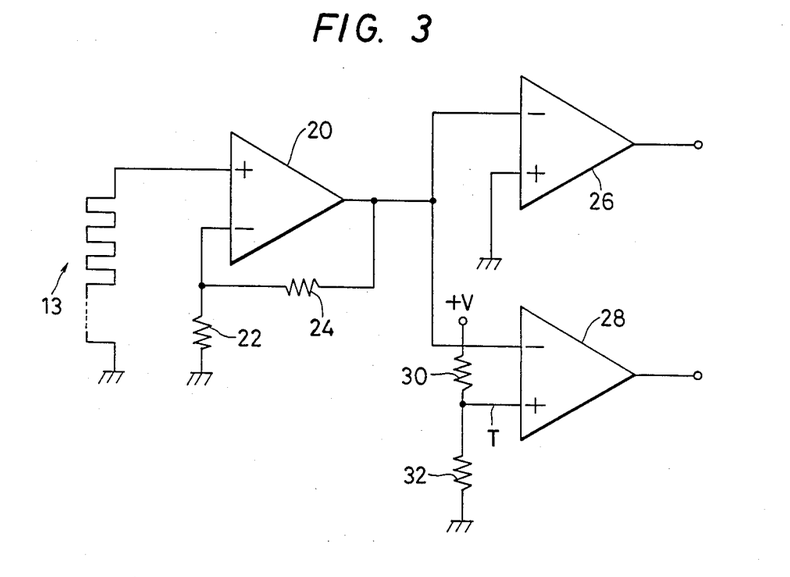
FIG. 3 shows a circuit arrangement for processing an output signal from a coil pattern of FIG. 1A.

FIG. 3 shows a circuit arrangement for processing an output signal, i.e. a generated or induced voltage across two terminals (not shown) of the printed coil pattern 13. The illustrated circuitry comprises an operational amplifier 20 having a noninverting input terminal (+) connected to one terminal of the coil pattern 13 and an inverting input terminal (−) connected via a resistor 22 to ground. The other terminal of the coil pattern 13 is grounded. The inverting input terminal (−) is connected via a feedback resistor 24 to an output terminal of the operational amplifier 20 which operates as a noninverting preamplifier so as to amplify the voltage generated across the coil pattern 13. An amplified voltage from the output terminal of the operational amplifier 20 is fed to inverting input terminal (−) of the two operational amplifiers 26 and 28 both used as comparators. A noninverting input terminal (+) of the operational amplifier 26 is grounded, while a noninverting input terminal of the operational amplifier 28 is connected to a voltage divider formed of two series resistors 30 and 32 which are interposed between a d.c. voltage supply +V and ground.

Figure 4A:
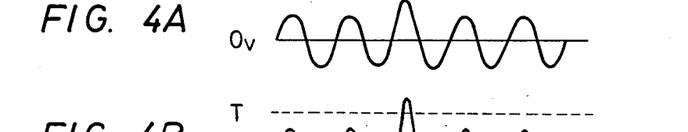
FIGS. 4A to 4D are waveform charts showing various signals in the circuitry of FIG. 3.
Figure 4B:
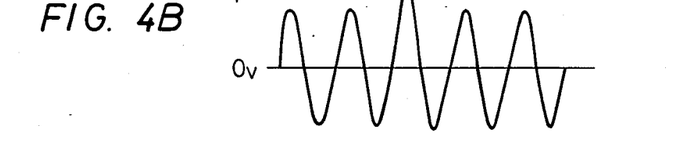
Figure 4C:
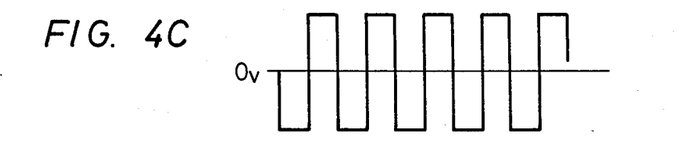
Figure 4D:
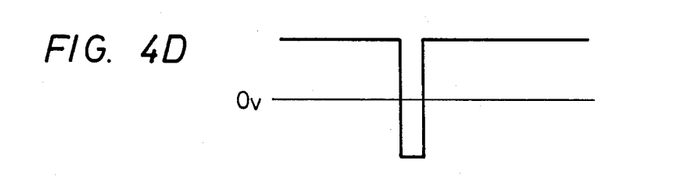

FIGS. 4A to 4D are waveform charts showing various voltage waveforms in the circuitry of FIG. 3, and the operation of the first embodiment will be described with reference to these waveform charts. Since the magnetized areas 16 of the rotor magnet 15 are arranged according to a given progression which is the same as that of the convex portions 13A in the wave-like coil pattern 13, the arrangement of the magnetized areas 16 agrees with the coil pattern 13 once per a revolution. At this time, the coil pattern 13 generates a maximum voltage which is higher than a voltage generated when the coil pattern 13 does not exactly agree with the particular arrangement of the magnetized areas 16. As shown in FIG. 4A, such a maximum voltage is induced only once in a full turn of the rotor magnet 15. This voltage is amplified by the preamplifier 20 (see FIG. 4B), and the amplified voltage is compared with two thresholds by the first and second comparators 26 and 28 respectively. As a result, rectangular continuous pulses are obtained from the output terminal of the first comparator 26 while a single pulse is obtained from the output terminal of the second comparator 30 per a revolution of the rotor magnet 15 as shown in FIGS. 4C and 4D respectively. In the above, the first comparator 26 is a zero-crossing detector which compares its input voltage with zero volt, while the second comparator 28 uses a positive d.c. voltage T obtained from the voltage divider as its threshold. In this way, the output signal from the first comparator 26 represents the rotational speed of the rotor magnet 15, while the output signal from the second comparator 28 represents a reference position or rotational angle of the rotor magnet 15.

Figure 5:
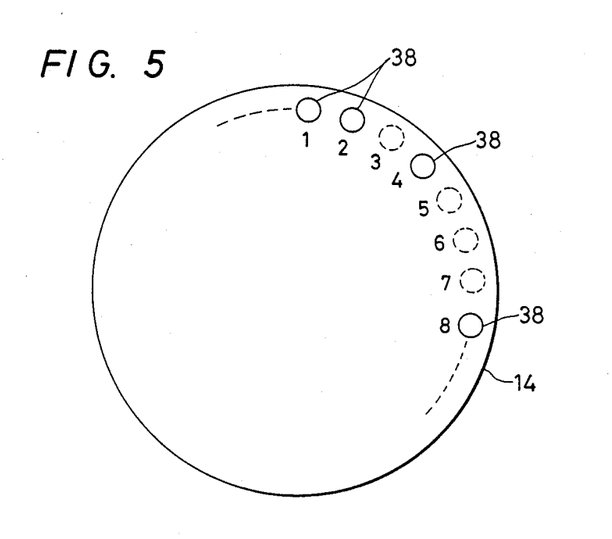
FIG. 5 is a top plan view of a stationary disc used in a modification of the first embodiment.

FIG. 5 shows a modification of the above-described first embodiment. In this modification, Hall generators 38 are used instead of the coil pattern 13 of FIG. 1A. More specifically, a plurality of Hall generators 38 are arranged in the same manner as the convex portions 13A in the wave-like coil pattern 13 so as to oppose the magnetized areas 16 of the rotor magnet 15 of FIG. 1B. The Hall generators 38 are arranged according to the same progression as that of the convex portions 13A of FIG. 1A, but other progression may be used in the same manner as described hereinabove. The Hall generators 38 are connected in series to produce a single output.

Figure 6A:
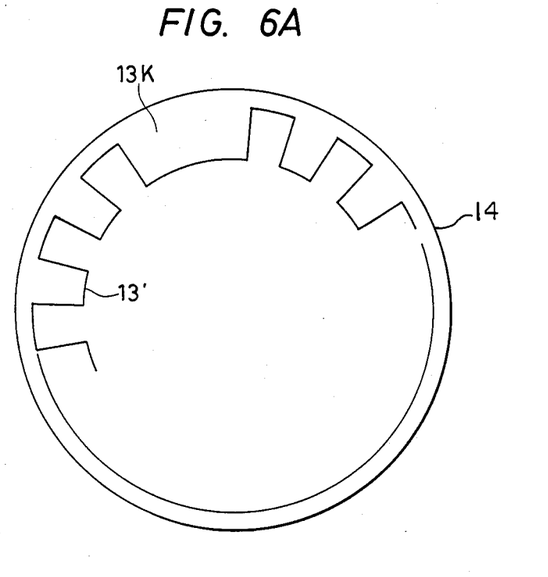
FIG. 6A is a top plan view of a stationary disc used in a second embodiment of the present invention.
Figure 6B:
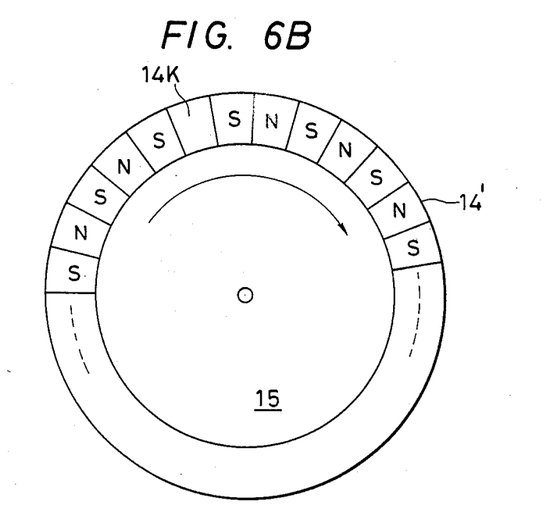
FIG. 6B is a top plan view of a rotary disc or rotor magnet also used in the second embodiment.

Reference is now made to FIGS. 6A and 6B showing a second embodiment of the present invention. FIGS. 6A and 6B respectively show a stationary disc 14 and a rotor magnet 15 arranged to oppose each other as shown in FIG. 2 in the same manner as in the first embodiment. On the surface of the stationary disc 14 is formed a wave-like coil pattern 13' having convex and concave portions alternately arranged one after another along the circumference of the disc 14. In the wave-like coil pattern, a convex portion is thinned out at a portion designated at the reference 13K. At this portion 13K, coil pitch is longer than that of remaining coil portion. Thus, this portion 13K will be referred to as a long-pitch portion hereinafter.

The rotor magnet 15 has a magnetized area 14' where N and S poles are alternately arranged along the circumference of the rotor magnet 15. Although N and S poles are arranged one after another without space therebetween along almost entire circumference, one sector portion 14K is not magnetized. In the illustrated embodiment, a sector between two S poles is not magnetized, and this portion or sector 14K will be referred to as nonmagnetized portion 14K.

Figure 7:
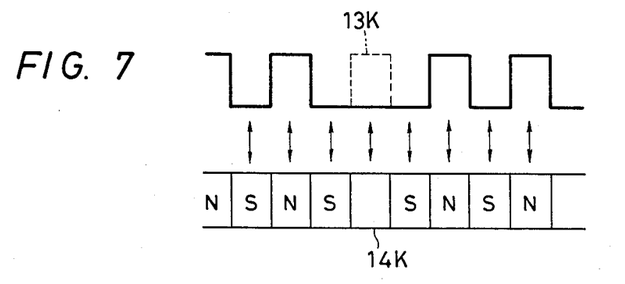
FIG. 7 is a developed view showing the relationship between the coil pattern and the magnetized portions in the second embodiment.

In the second embodiment, the coil pattern 13 of FIG. 6A is also connected to the circuitry of FIG. 3 to detect both rotational speed signal (FIG. 4C) and a reference position signal (FIG. 4D). More specifically, during rotation of the rotor magnet 15 when the nonmagnetized portion 14K does not face the long-pitch portion 13K, only low amplitude pulses are generated because at least one convex portion in the coil pattern 13 is not used for generating a voltage when it faces the nonmagnetized portion 14K. On the other hand, when the nonmagnetized portion 14K opposes the long-pitch portion 13K as shown in a developed view of FIG. 7, then a high level pulse is produced because all the wave-like coils induce volage respectively and these induced voltages are added to each other. Thus, a resultant voltage obtained across the coil pattern 13 of FIG. 6A shows a waveform similar to that of FIG. 4A, and therefore, this voltage is processed in the same manner as in FIG. 3.

Figure 8:
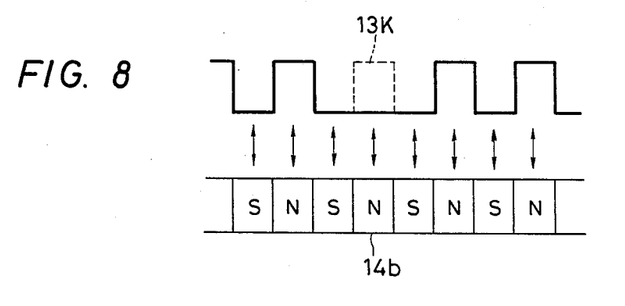
FIGS. 8 and 9 are developed views respectively showing modifications of the second embodiment.

FIG. 8 shows a modification of the second embodiment by way of a developed view. In this modification, a portion 14b corresponding to the above-mentioned nonmagnetized portion 14K is magnetized but its magnetizing level is lower than that of remaining magnetized portions. Since magnetic flux from this weakly magnetized portion 14b is less than that from remaining magnetized portions, an output signal similar to FIG. 4A is resulted, and thus similar operation for detecting rotational angle and reference position is achieved.

Figure 9:
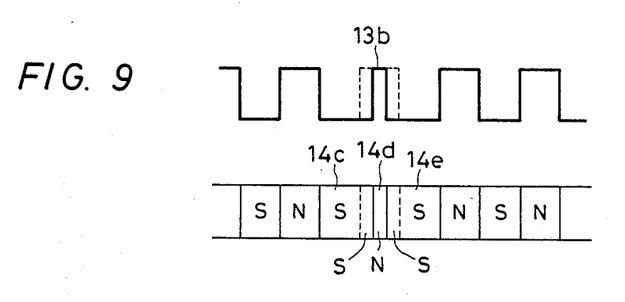

FIG. 9 shows a further modification of the second embodiment. In FIG. 9, the coil pattern 13 comprises a very narow pitch convex portion 13b in the long-pitch portion 13K of FIG. 6A or 7, while a very narrow magnetized portion 14d is interposed between two nonmagnetized portions 14c and 14e which are also narrow so that these three portions 14c, 14d and 14e are positioned at a portion or sector corresponding to the nonmagnetized portion 14K of FIG. 6B or 7. This further modification also operates in the same manner as the above-described second embodiment.

Figure 10A:
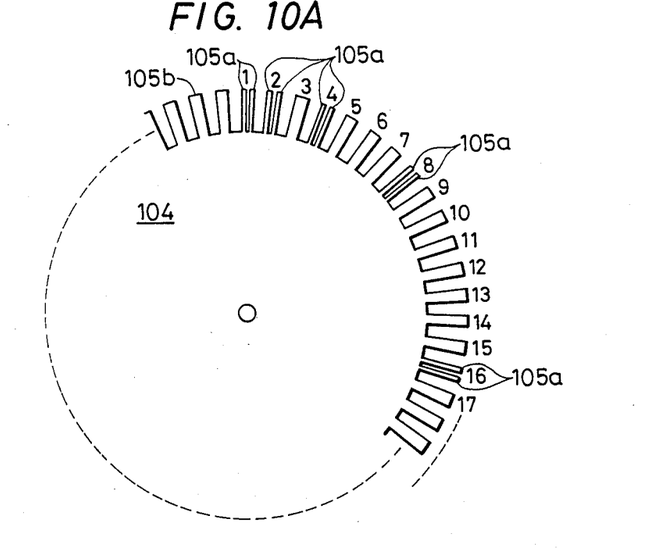
FIG. 10A is a top plan view of a stationary disc used in a third embodiment of the present invention.
Figure 10B:
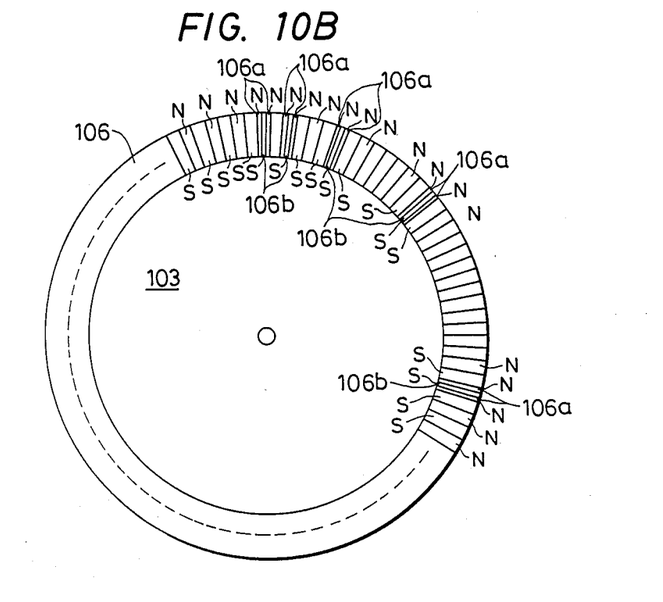
FIG. 10B is a top plan view of a rotary disc or rotor magnet also used in the third embodiment.

Reference is now made to FIGS. 10A and 10B showing a third embodiment of the present invention. FIG. 10A shows a stationary disc 14 on which a wave-like coil pattern 105 is formed and FIG. 10B shows a rotor magnet 15 having a plurality of magnetized areas 106 in somewhat similar manner to the previous embodiments. In the first embodiment of FIGS. 1A and 1B although convex portions in the wave-like coil pattern 13 are thinned out and the magnetized areas are also thinned out, coils and magnetized areas in the third embodiment of FIGS. 10A and 10B are respectively positively provided at portions corresponding to the thinned out portions in FIGS. 1A and 1B. More specifically, in the coil pattern 105, there are normal-pitch portions 105b and small-pitch portions 105a such that the small-pitch portions 105a are provided according to a given progression such as geometrical progression, which goes 1, 2, 4, 8, 16 . . . for instance with respect to the normal-pitch portions 105b. The magnetized portions 106 in the rotor magnet 15 are also arranged so that normal pitch areas 106b of N and S poles and small-pitch portions 106a of N and S poles are arranged in the same order as in the coil pattern 105.

Figure 11:
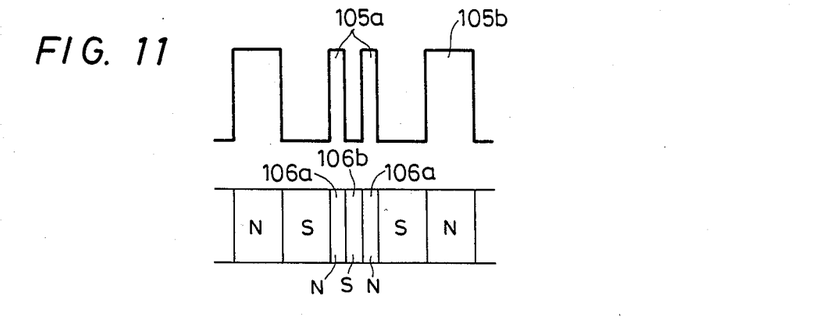
FIG. 11 is a developed view showing the relationship between the coil pattern and the magnetized portions in the third embodiment.

With this arrangement, the magnetized areas 106 of the rotor magnet 15 agree with the wave-like coil pattern exactly once per a revolution thereof in the same manner as in the first embodiment. This state is shown in a developed view of FIG. 11. As a result, a voltage having a waveform of FIG. 4A is obtained across the coil pattern 105 to detect the rotational speed and reference position. Although the coil pattern 105 and the magnetized portions 106 are arranged in accordance with a geometrical progression, other progression other than arithmetical progression may be applicable. Furthermore, the arrangement of the magnetized areas 106 and the coil pattern 105 is not required to accord with a given progression. All that is required that the magnetized areas 106 agree with the wave like coil pattern exactly only once per a revolution of the rotor magnet 15 or per rotation over a given angle.

Figure 12:
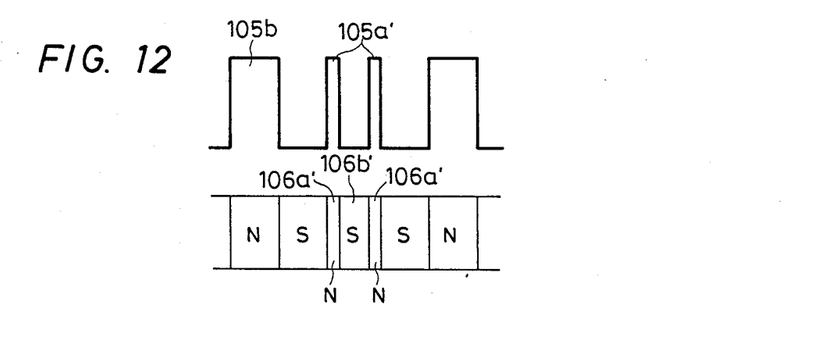
FIGS. 12 and 13 are developed views respectively showing modifications of the third embodiment.

FIG. 12 shows a modification of the third embodiment by way of a developed view. In this modification, the width of small-pitch coil 105a is further reduced from that of FIG. 11 so that the width of convex portion 105a' is about one half the width of a concave portion 106b' interposed between two adjacent small-pitch convex portions 105a'. Similarly, the width of a small-pitch magnetized portion 106a' of one polarity, i.e. N pole in the illustrated case, is set to be one half the width of a magnetized portion 106b' of the other polarity, i.e. S pole in this case, interposed between the small-pitch magnetized portions 106a'.

Figure 13:
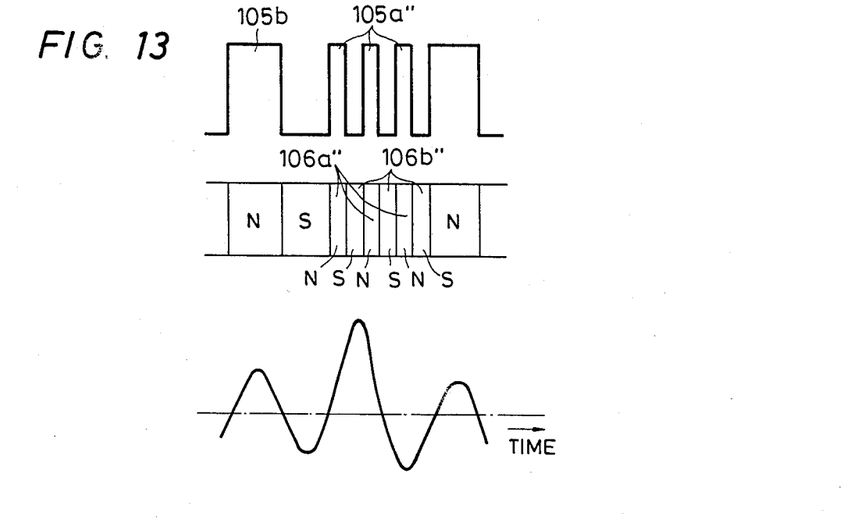

FIG. 13 shows a further modification of the third embodiment. In FIG. 13, three small-pitch convex coils 105a'' are provided in place of the two convex portions 105a or 105a' of FIGS. 11 or 12. Furthermore, magnetized portions 106a'' and 106b'' arranged to face the three small-convex coils 105a'' have a narrow pitch which is equal to that of the small-pitch coil portions 105a''. More specifically, three N poles 106a'' and three S poles 106b'' are alternately arranged to correspond to the small-pitch coil portions 105a''. Comparing this arrangement of FIG. 13 with FIG. 11, a peak value generated when the small-pitch magnetized portions 106a'' and 106b'' face the three small-pitch coil portions 105a'' is much higher than that obtained in the arrangement of FIG. 11. The waveform shown at the bottom of FIG. 13. shows the voltage from the above-described arrangement of FIG. 13. It is to be noted that not only the peak voltage (the center peak in the waveform) is higher than that of the arrangement of FIG. 11 but also a subsequent peak (the peak at the right) is lower than that of the arrangement of FIG. 11 so that the center peak can be readily detected. Thus, more accurate detection of a reference position signal is now possible.

From the foregoing it will be understood that the apparatus according to the present invention requires less number of parts and simultaneous detection of a speed signal and a reference position is possible with small-sized structure. Furthermore, accurate detection is achieved with sufficient signal output level so that undesirable influence due to jitter is removed even if the number of elements, such as magnetic poles, is small. Since sufficiently large amplitude is obtained in the detected signals, superior signal-to-noise (S/N) ratio is obtained.

The above-described embodiments are just examples of the present invention, and therefore, it will be apparent for those skilled in the art that many modifications and variations may be made without departing from the scope of the present invention.

What is claimed is:

1. Apparatus for producing a signal indicative of a rotational speed of a rotary member and another signal indicative of a reference rotational angle of said rotary member, comprising:
   (a) a plurality of magnetized elements arranged circumferentially on said rotary member, said plurality of magnetized elements having normal-pitch elements and small-pitch elements which are arranged in a predetermined fashion or pattern given by $2^n \cdot K$ in units of said normal-pitch where $n = 1, 2, 3, \ldots$ and K is a positive integer, the number of said small-pitch elements being at least three, and the distance between any two consecutive small-pitch elements being different from another;

(b) a plurality of signal generating circuits arranged circumferentially on a stator to oppose said plurality of magnetized elements when said rotary member rotates, said plurality of signal generating circuits being connected in series to form a series circuit so as to develop a resultant voltage across two terminals of said series circuit with said signal generating circuits being caused by said magnetized elements to generate a voltage, said plurality of signal generating circuits having normal-pitch circuits and small-pitch circuits which are arranged in said predetermined fashion or pattern so that said normal-pitch magnetized elements face said normal-pitch circuits and said small-pitch magnetized elements face said small-pitch circuits respectively only once per rotation of said rotary member over a predetermined angle;

(c) a first comparator responsive to said resultant voltage and to a first threshold voltage for producing said signal indicative of a rotational speed; and (d) a second comparator responsive to said resultant voltage and to a second threshold voltage, which is different from said first threshold voltage, for producing said other signal indicative of a reference rotational angle of said rotary member.

2. Apparatus as claimed in claim 1, wherein said small-pitch elements are arranged in accordance with a given progression other than arithmetical progression with respect to said normal-pitch elements.

3. Apparatus as claimed in claim 1, wherein said small-pitch elements are arranged in accordance with a geometrical progression with respect to said normal-pitch elements.

4. Apparatus as claimed in claim 1, wherein said elements are magnetized portions of said rotary member, said magnetized portions have sectors arranged circumferentially.

5. Apparatus as claimed in claim 1, wherein said series circuit comprises a wave-like coil pattern.

6. Apparatus as claimed in claim 5, wherein said coil pattern comprises small-pitch portions at an interval which increases according to geometrical progression so that the distance between two consecutive small-pitch portions becomes longer from a given point of said coil pattern along the circumference thereof.

7. Apparatus as claimed in claim 1, wherein said series circuit comprises a plurality of Hall generators connected in series.

8. Apparatus as claimed in claim 1, wherein each said interval between any two consecutive small-pitch elements is selected from a geometrical progression.

* * * * *